(No Model.)

L. GODDU.
PAWL FOR SOLE SEWING MACHINES.

No. 301,493. Patented July 8, 1884.

Witnesses.
John F. C. Brinkert
Henry Marsh

Inventor.
Louis Goddu
by Crosby Gregory attys

UNITED STATES PATENT OFFICE.

LOUIS GODDU, OF WINCHESTER, MASSACHUSETTS.

PAWL FOR SOLE-SEWING MACHINES.

SPECIFICATION forming part of Letters Patent No. 301,493, dated July 8, 1884.

Application filed February 11, 1884. (No model.)

*To all whom it may concern:*

Be it known that I, LOUIS GODDU, of Winchester, county of Middlesex, State of Massachusetts, have invented an Improvement in Pawls for Sole-Sewing Machines, of which the following description, in connection with the accompanying drawings, is a specification, like letters on the drawings representing like parts.

Sole-sewing machines, especially those represented in United States Patent No. 36,163, employ pawls to retain in position ratchets, which are changed by variations in the thickness of the stock. The teeth of these pawls, made of steel, are frequently broken, and the cost of replacing them is considerable.

The object of my invention is to produce a more durable pawl, one which, if its tooth breaks, may be readily repaired.

My invention consists in a pawl provided with a detachable tooth, as will be described, whereby, should a tooth break, another one may be readily inserted for it in the same body, thus avoiding the cost of an entire new pawl.

Figure 1:
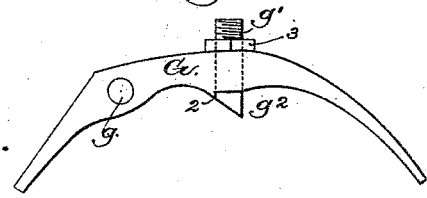
Figure 2:
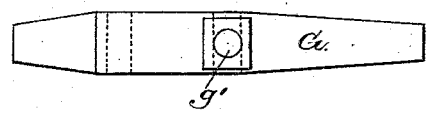

Figure 1 in side elevation represents a pawl embodying my invention; Fig. 2, an outer side elevation thereof; and Figs 3 and 4 represent an ordinary pawl, such as was in common use prior to my invention.

Figure 3:
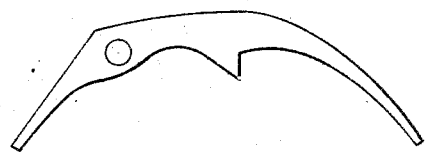
Figure 4:
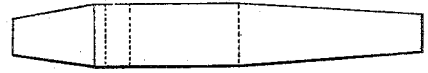

Referring, first, to Figs. 3 and 4, A represents a pawl, having a tooth, B, forming an integral part of it, it being such as in common use in the so-called "McKay sole-sewing machine," and such as represented by the letter $l'$ in United States Patent No. 36,163, to which reference may be had.

My improved pawl is composed of a body, G, of steel, provided with a hole, $g$, to receive the pawl or pin on which the pawl turns, and with a second hole at right angles to it, and with a shoulder, 2, the latter hole receiving the shank $g'$ of a tooth, $g^2$, of steel, the latter bearing against the inner side or face of the body G of the pawl and against the shoulder 2, which thus prevents the tooth from rotating. Should the tooth $g^2$ break, it is only necessary to remove the shank of the tooth from the body G and replace it by a new tooth, which can be done in a few moments at but a trifling expense as compared with the cost of the entire pawl, as is now the case.

The shank of the tooth may be held in place by a suitable nut, 3. (Shown in Fig. 1.)

I claim—

1. As an improved article of manufacture, a pawl composed of the body G and the removable tooth $g^2$, all substantially as and for the purpose set forth.

2. The body G of the pawl, provided with a shoulder, 2, combined with the threaded tooth $g^2$, provided with the shank $g'$, and with means, substantially as described, to hold the tooth in place, substantially as described.

In testimony whereof I have signed my name to this specification in the presence of two subscribing witnesses.

LOUIS GODDU.

Witnesses:
GEO. W. GREGORY,
B. J. NOYES.